United States Patent
Sun et al.

(10) Patent No.: US 11,038,368 B2
(45) Date of Patent: Jun. 15, 2021

(54) METHOD OF CONTROLLING POWER SUPPLY OF CARAVAN AND POWER CONTROL DEVICE OF CARAVAN

(71) Applicant: Shenzhen Hello Tech Energy Co., LTD., Shenzhen (CN)

(72) Inventors: Zhongwei Sun, Shenzhen (CN); Shiji Wu, Shenzhen (CN); Zhiyuan Zhong, Shenzhen (CN); Xuhe Liu, Shenzhen (CN)

(73) Assignee: SHENZHEN HELLO TECH ENERGY CO., LTD., Shenzhen (CN)

( * ) Notice: Subject to any disclaimer, the term of this patent is extended or adjusted under 35 U.S.C. 154(b) by 0 days.

(21) Appl. No.: 16/726,766

(22) Filed: Dec. 24, 2019

(65) Prior Publication Data

US 2021/0013733 A1  Jan. 14, 2021

(30) Foreign Application Priority Data

Jul. 11, 2019 (CN) .......................... 201910624196.4

(51) Int. Cl.
| | |
|---|---|
| H02J 1/00 | (2006.01) |
| H02M 5/42 | (2006.01) |
| H02M 7/04 | (2006.01) |
| H02J 7/35 | (2006.01) |
| B60R 16/033 | (2006.01) |
| H02J 4/00 | (2006.01) |
| H02J 7/00 | (2006.01) |

(52) U.S. Cl.
CPC .............. *H02J 7/35* (2013.01); *B60R 16/033* (2013.01); *H02J 4/00* (2013.01); *H02J 7/0047* (2013.01)

(58) Field of Classification Search
None
See application file for complete search history.

(56) References Cited

U.S. PATENT DOCUMENTS 7,989,981 B2 * 8/2011 Zhang ................ H01R 13/6675
307/66
9,362,838 B1 * 6/2016 Balogh .................... H02M 7/04

* cited by examiner

*Primary Examiner* — Kenneth B Wells

(57) ABSTRACT

A method of controlling power supply of a caravan including a photovoltaic plate includes: receiving a first power parameter of an input interface element; determining whether there is a mains supply to be input into the input interface element according to the first power parameter; turning on a first switch to make the input interface element be electrically connected to the output interface element if the mains supply is input into the input interface element; receiving a power parameter of a battery pack if the mains supply is not input into the input interface element; determining whether a remaining power of the battery pack exceeds a power threshold according to the power parameter of the battery pack; and making the battery pack be electrically connected to an output interface element if the remaining power of the battery pack exceeds the power threshold.

19 Claims, 4 Drawing Sheets

METHOD OF CONTROLLING POWER SUPPLY OF CARAVAN AND POWER CONTROL DEVICE OF CARAVAN

TECHNICAL FIELD

The disclosure relates to the field of caravan, and more particularly to a method of controlling power supply of a caravan and a power control device of a caravan.

BACKGROUND

When a caravan is stationed in a camp, it will not always start the engine to power electrical equipment by using a self-contained generator. If an external gasoline generator is used, a lot of noise will be generated, which is not environmentally friendly. With the development of photovoltaic and lithium-ion battery, the clean energy system combining photovoltaic and lithium-ion battery has aroused more and more attention. In addition to the support of various policies for new energy, more and more people choose to install a photovoltaic and lithium-ion battery energy storage system on the caravan.

How to control the power resources of the caravan to make full use of the power resources is an urgent technical problem to be solved by those skilled in the art.

SUMMARY

One objective of the disclosure is to provide a method of controlling power supply of a caravan and a power control device of a caravan, to realize the full utilization of the power resources of the caravan.

To achieve the above objective, the disclosure provides a method of controlling power supply of a caravan. The method is applied to a power control device of a caravan, wherein the caravan comprises a photovoltaic plate; the power control device comprises a battery pack, an input interface element, an output interface element, and a first switch; the photovoltaic plate is electrically connected to the battery pack via the input interface element, and the battery pack is electrically connected to an external electrical equipment via the output interface element; the first switch is electrically connected to the input interface element and the output interface element; and the method comprises:

receiving a first power parameter of the input interface element;

determining whether there is a main supply to be input into the input interface element according to the first power parameter;

turning on the first switch to make the input interface element be electrically connected to the output interface element if the mains supply is input into the input interface element;

receiving a power parameter of the battery pack if the mains supply is not input into the input interface element;

determining whether a remaining power of the battery pack exceeds a power threshold according to the power parameter of the battery pack; and making the battery pack be electrically connected to the output interface element if the remaining power of the battery pack exceeds the power threshold.

As an improvement, the input interface element comprises a first input interface, and the output interface element comprises an AC output interface; the first input interface is electrically connected to the AC output interface via the first switch; the method further comprises:

after receiving the first power parameter of the input interface element, determining whether the mains supply is input into the first input interface according to the first power parameter;

turning on the first switch to make the first input interface be electrically connected to the AC output interface if the mains supply is input into the first input interface; and receiving the power parameter of the battery pack if the mains supply is not input into the first input interface.

As an improvement, the battery pack is electrically connected to the AC output interface via an inverter and a second switch; the method further comprises:

after determining whether the remaining power of the battery pack exceeds the power threshold according to the power parameter of the battery pack, turning on the second switch to make the battery pack be electrically connected to the AC output interface via the inverter if the remaining power of the battery pack exceeds the power threshold.

As an improvement, the input interface element further comprises a second input interface electrically connected to the battery pack via a first charger; and the method further comprises:

receiving a second power parameter of the input interface element;

determining whether there is a photovoltaic supply to be input into the second input interface according to the second power parameter; and turning on a switch of the first charger to make the battery pack be electrically connected to the photovoltaic plate via the first charger if the photovoltaic supply is input into the second input interface.

As an improvement, the power control device further comprises a third switch and a second charger, the first input interface is electrically connected to the battery pack via the third switch and the second charger; and the method further comprises:

turning on the third switch to make the first input interface be electrically connected to the battery pack via the second charger if the photovoltaic supply is not input into the second input interface.

As an improvement, the power control device further comprises a third switch and a second charger, the first input interface is electrically connected to the battery pack via the third switch and the second charger; and the method further comprises:

receiving a photovoltaic power of the second input interface if the photovoltaic supply is input into the second input interface;

determining whether the photovoltaic power exceeds a photovoltaic power threshold;

turning off the third switch if the photovoltaic power exceeds the photovoltaic power threshold; and turning on the third switch if the photovoltaic power does not exceed the photovoltaic power threshold.

As an improvement, the input interface element further comprises a third input interface electrically connected to a power generator of the caravan, and the third input interface is electrically connected to the battery pack via a third charger; and the method further comprises:

determining whether the caravan starts if the mains supply is not input into the first input interface and the photovoltaic supply is not input into the second input interface; and turning on the third charger to make the third input interface be electrically connected to the battery pack via the third charger if the caravan starts.

As an improvement, the method further comprises:
receiving load power information of the AC output interface; and
controlling a power supply type of the AC output interface according to the load power information.

As an improvement, the power supply type comprises a first power supply type and a second power supply type; controlling the power supply type of the AC output interface according to the load power information comprises:
determining whether the load power information exceeds a load power threshold; and
selecting the second power supply type if the load power information exceeds the load power threshold, and the second power supply type supplies power to a preset electrical equipment.

As an improvement, the power control device further comprises a converter and a DC output interface; the converter is electrically connected to the battery pack and the DC output interface; and the method further comprises:
turning on the converter to make the battery pack be electrically connected to the DC output interface if the remaining power of the battery pack exceeds the power threshold.

As an improvement, the power control device further comprises a display screen, and the method further comprises displaying the power parameter of the battery pack on the display screen.

The disclosure also provides a power control device of a caravan, the caravan comprising a photovoltaic plate, and the power control device comprising:
an input interface element configured to receive an external current;
an output interface element configured to transmit a current to an external electrical equipment;
a battery pack being electrically connected to the input interface element and the output interface element; and
a first switch.

The photovoltaic plate is electrically connected to the battery pack via the input interface element, and the battery pack is electrically connected to the external electrical equipment via the output interface element; the first switch is electrically connected to the input interface element and the output interface element; and an external mains supply is transmitted to the external electrical equipment via the input interface element, the first switch, and the output interface element.

As an improvement, the power control device further comprises a first charger, and the input interface element comprises a first input interface and a second input interface; the first input interface is connected to the external mains supply and is electrically connected to the output interface element via the first switch; the second input interface is electrically connected to the photovoltaic plate, and is electrically connected to the battery pack via the first charger.

As an improvement, the power control device further comprises a third switch and a second charger, and the first input interface is connected to the battery pack via the third switch and the second charger.

As an improvement, the power control device further comprises a third charger, and the input interface element further comprises a third input interface electrically connected to a power generator; the third input interface is electrically connected to the battery pack via the third charger.

As an improvement, the output interface element comprises an AC output interface electrically connected to the first switch.

As an improvement, the power control device further comprises an inverter and a second switch; and the battery pack is electrically connected to the AC output interface via the inverter and the second switch.

As an improvement, the power control device further comprises a converter; the output interface element further comprises a DC output interface; the battery pack is electrically connected to the DC output interface via the converter.

As an improvement, the power control device further comprises a display screen electrically connected to the battery pack to display a power parameter of the battery pack.

As an improvement, the power control device further comprises a memory and a processor; the battery pack, the input interface element, the output interface element, and the memory are electrically connected to the processor; the memory is configured to store a computer executable power control program of the caravan; and the processor is configured to call the computer executable power control program stored in the memory to execute the method of controlling power supply of the caravan.

Compared with the prior art, the disclosure provides a method of controlling power supply of a caravan and a power control device of a caravan. The method is applied to the power control device of the caravan, and the caravan comprises a photovoltaic plate. The power control device comprises a battery pack, an input interface element, an output interface element, and a first switch. The photovoltaic plate is electrically connected to the battery pack via the input interface element, and the battery pack is electrically connected to an external electrical equipment via the output interface element. The first switch is electrically connected to the input interface element and the output interface element. And the method comprises: receiving a first power parameter of the input interface element; determining whether there is mains supply to be input into the input interface element according to the first power parameter; turning on the first switch to electrically connect the input interface element and the output interface element if the mains supply is input into the input interface element; receiving a power parameter of the battery pack is the mains supply is not input into the input interface element; determining whether a remaining power of the battery pack exceeds a power threshold according to the power parameter of the battery pack; and making the battery pack be electrically connected to the output interface element if the remaining power of the battery pack exceeds the power threshold.

The power control method and the power control device of the caravan provided by the disclosure can monitor whether the input interface element has a mains supply; if the mains supply is input into the input interface element, the input interface element is electrically connected to the output interface element, and the mains supply is transmitted to the external electrical equipment; if the mains supply is not input into the input interface element, determining whether the power of the battery pack is sufficient, if the power is sufficient, the batter pack supplies power to the external electrical equipment, to realize the full use of the power supply of the caravan.

DETAILED DESCRIPTION OF THE PREFERRED EMBODIMENTS

Figure 1:
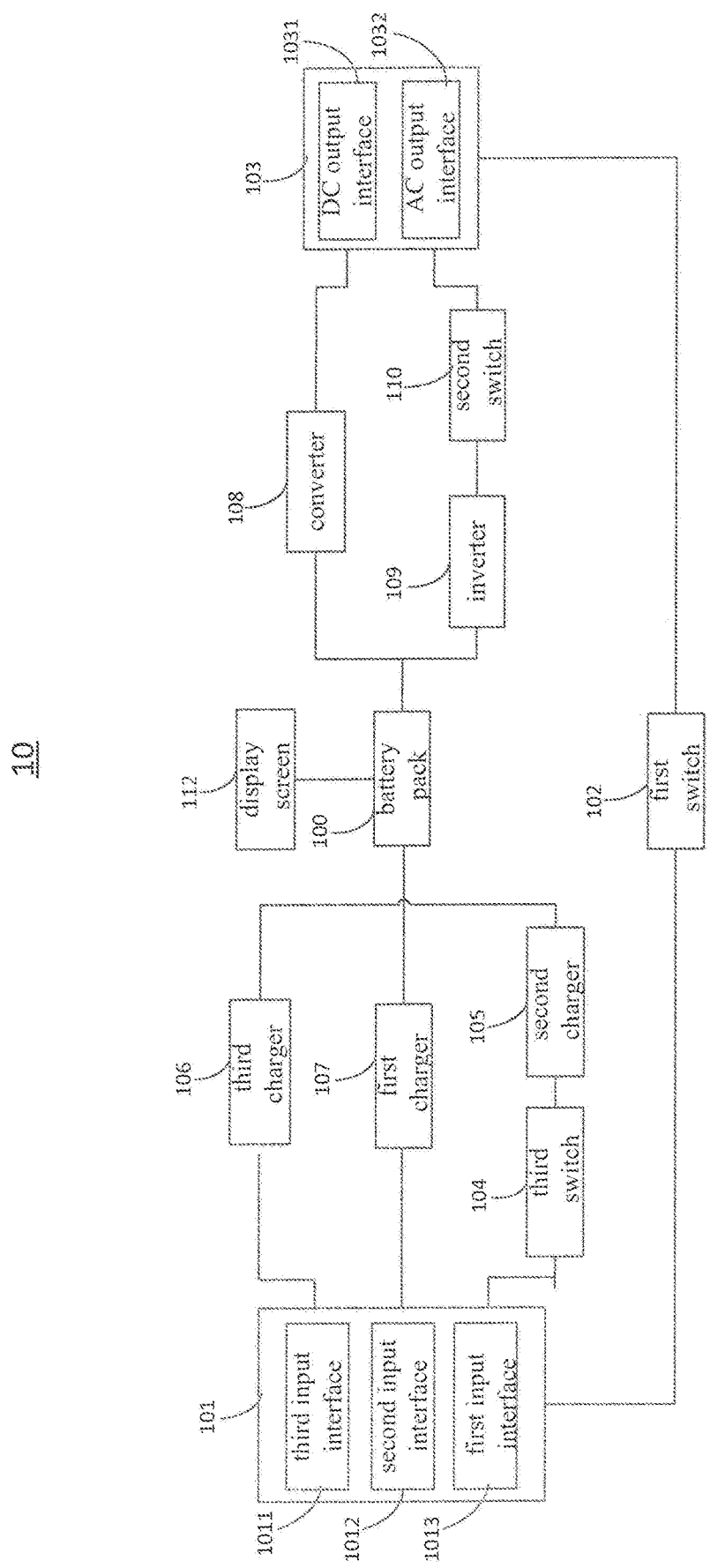
FIG. 1 is a block diagram of a power control device of a caravan according to one embodiment of the discourse.

In order to make the objects, technical solutions and advantages of the disclosure much clear, the disclosure will be described in greater detail with reference to the combination of the embodiments and the drawings. It should be noted that the embodiments described herein are merely illustrative of the disclosure and do not limit the scope of the disclosure.

The terms "first", "second", "third", "fourth" and the like (if any) in the description and claims of the invention and the above drawings are used to distinguish similar objects, and need not be used to describe specific order or sequence. It should be understood that the data so used can be interchanged where appropriate so that the embodiments described herein can be applied in order other than what is illustrated or described here. In addition, the terms "include" and "have" and any of their variations are intended to cover the nonexclusive inclusion, for example, a process, method, system, product or device that contains a series of steps or units, but the disclosure need not be limited to those steps or units that are clearly listed, and may include some other steps or units that are not clearly listed or are fixed to those processes, methods, products or devices.

It should be noted that the description of "first", "second" and the like in the present invention is only used for description purposes, and cannot be understood as indicating or implying its relative importance or implying the number of indicated technical features. Thus, a feature defined as "first" or "second" may include at least one such feature, either explicitly or implicitly. In addition, the technical solutions among the embodiments can be combined with each other, but it must be based on the implementation by ordinary technicians in the art. When the combination of the technical solutions is contradictory or cannot be realized, it should be considered that the combination of the technical solutions does not exist, nor is it within the scope of protection of the disclosure.

The disclosure provides a power control device of a caravan and a method of controlling power supply of the caravan. The method of controlling power supply of the caravan is applied to the power control device of the caravan. The caravan comprises a photovoltaic plate; the power control device comprises a battery pack, an input interface element, an output interface element, and a first switch. The photovoltaic plate is electrically connected to the battery pack via the input interface element, and the battery pack is electrically connected to external electrical equipment via the output interface element. The first switch is electrically connected to the input interface element and the output interface element. The method comprises: receiving a first power parameter of the input interface element; determining whether there is mains supply to be input into the input interface element according to the first power parameter; turning on the first switch to make the input interface element be electrically connected to the output interface element if the mains supply is input into the input interface element; receiving a power parameter of the battery pack if the mains supply is not input into the input interface element; determining whether a remaining power of the battery pack exceeds a power threshold according to the power parameter of the battery pack; and making the battery pack be electrically connected to the output interface element if the remaining power of the battery pack exceeds the power threshold.

The power control device of the caravan and the method of controlling power supply of the caravan provided by the disclosure can monitor whether the mains supply is input into the input interface element. If the mains supply is input into the input interface element, the input interface element is controlled to be electrically connected to the output interface element, and the mains supply is transmitted to the electrical equipment. If the mains supply is not input into the input interface element, it is need to determine whether the power of the battery pack is sufficient, when the power of the battery pack is sufficient, the electrical equipment can be charged by the batter pack, which realizes the full use of the power supply of the caravan.

Specifically, the input interface element comprises a first input interface, and the output interface element comprises an Alternating-Current (AC) output interface. The first input interface is electrically connected to the AC output interface via the first switch, and the battery pack is electrically connected to the AC output interface via an inverter and a second switch; the method of controlling power supply of the caravan comprises: receiving the first power parameter of the input interface element; determining whether the mains supply is input into the first input interface according to the first power parameter; turning on the first switch to make the first input interface be electrically connected to the AC output interface if the mains supply is input into the first input interface; receiving the power parameter of the battery pack if the mains supply is not input into the first input interface; determining whether the remaining power of the battery pack exceeds the power threshold according to the power parameter of the battery pack; and turning on the second switch to make the battery pack be electrically connected to the AC output interface via the inverter if the remaining power of the battery pack exceeds the power threshold.

The power control device of the caravan and the method of controlling power supply of the caravan provided by the disclosure can monitor whether the mains supply is input into the input interface element. If the mains supply is input into the input interface element, the first input interface of the input interface element is controlled to be electrically connected to the AC output interface, and the mains supply is transmitted to the electrical equipment. If the mains supply is not input into the input interface element, it is need to determine whether the power of the battery pack is sufficient, when the power of the battery pack is sufficient, the batter pack supplies power to the AC output interface via an inverter branch, which realizes the full use of the power supply of the caravan.

As shown in FIG. 1, the disclosure provides a power control device 10 of a caravan. The power control device 10 comprises a battery pack 100, a first switch 102, an input interface element 101 configured to receive an external current, and an output interface element 103 configured to transmit a current to an external electrical equipment. The input interface element 101 is electrically connected to the battery pack 100 and configured to provide a charging interface for an external charging power supply, so that the external charging power supply can charge the battery pack 100. The output interface element 103 is electrically connected to the battery pack 100 and configured to provide a discharge interface for the battery pack 100, so that the battery pack 100 can supply power to the external electrical equipment. The first switch 102 is connected to the input interface element 101 and the output interface element 103, so that the input interface element 101 can be electrically connected to the output interface element 103 through the first switch 102, thus the external charging power supply can directly supply power for the external electrical equipment.

The power control device 10 is also provided with a first charger 107, a second charger 105, a third charger 106, a second switch 110, a third switch 104, an inverter 109, a converter 108 and a display screen 112. The first charger 107, the second charger 105 and the third charger 106 are all connected to the battery pack 100 and the input interface assembly 101 so that the input interface element 101 can charge the battery pack 100 through the first charger 107, the second charger 105, or the third charger 106.

The converter 108 is electrically connected to the battery pack 100 and the output interface element 103 to convert an output voltage of the battery pack 100 into a voltage that can be adapted to different electrical equipment and output the voltage to the output interface element 103 to supply power to the electrical equipment of different voltage levels through the output interface element 103.

The inverter 109 is electrically connected to the battery pack 100 and the output interface element 103 and configured to convert a direct-current (DC) voltage of the battery pack 100 into an AC voltage, so as to supply power for the external electrical equipment which demands the AC voltage.

The display screen 112 is electrically connected to the battery pack 100 and configured to display relevant battery parameter information of the battery pack 100 in real time, so that the user can know the battery state in time.

Specifically, the input interface element 101 comprises a first input interface 1013, a second input interface 1012, and a third input interface 1011. The output interface element 103 comprises a DC output interface 1031 and an AC output interface 1032. The first input interface 1013 is electrically connected to the battery pack 100 through the third switch 104 and the second charger 105, the second input interface 1012 is electrically connected to the battery pack 100 through the first charger 107, and the third input interface 1011 is electrically connected to the battery pack 100 through the third charger 106.

The first input interface 1013 can be electrically connected to the mains supply so that the mains supply can charge the battery pack 100 through the first input interface 1013.

The second input interface 1012 can be electrically connected to an output plug of the photovoltaic plate, so that the photovoltaic plate can charge the battery pack 100 through the second input interface 1012.

The third input interface 1011 can be electrically connected to a power generator arranged on the caravan to supply power to the battery pack 100 through the power generator.

In some embodiments, the power control device 10 may also comprise a communication module, which may be a network communication module, a WiFi module, and a Bluetooth communication module. The power control device 10 can communicate with remote terminal equipment through the communication module, so that the user can remotely monitor and control the operation of the power control device 10.

Figure 2:
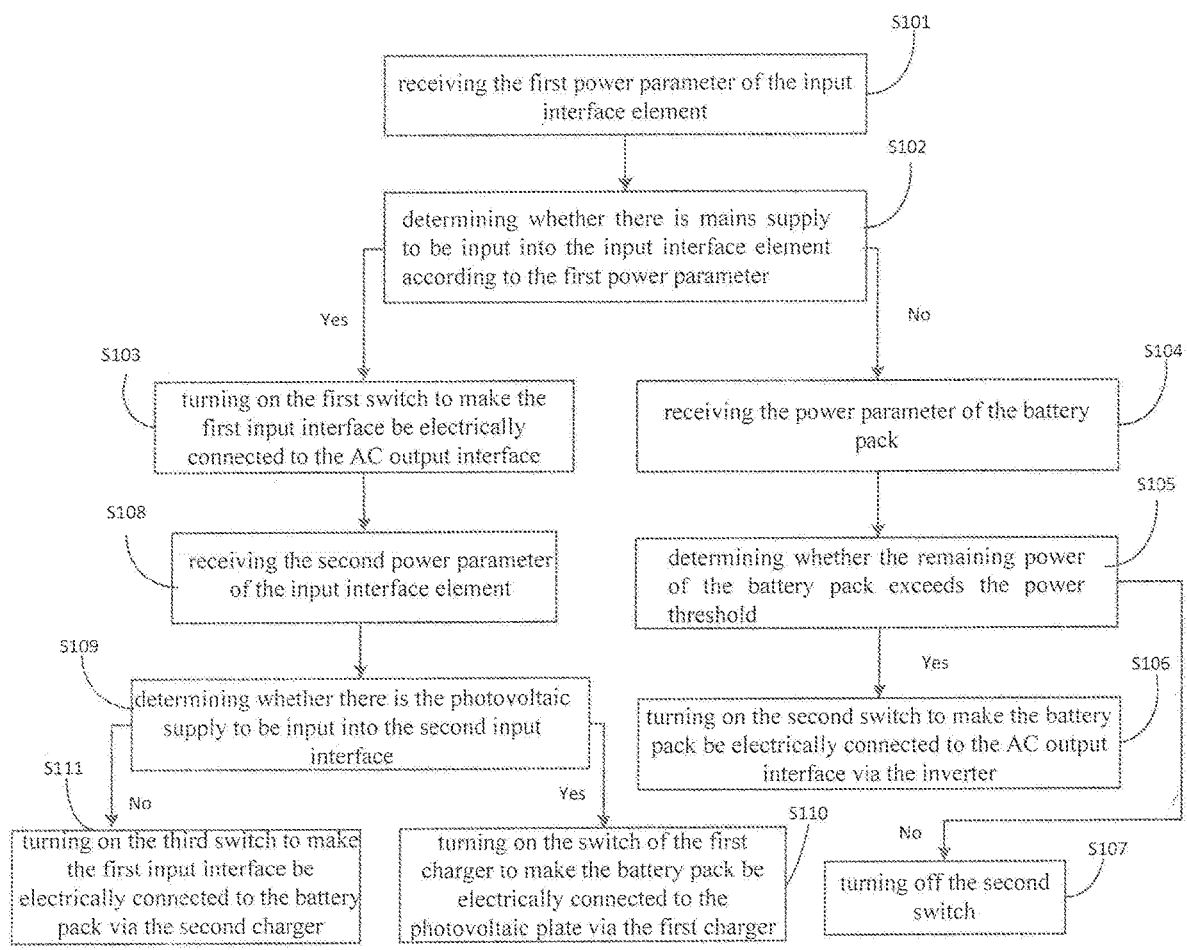
FIG. 2 is a flow chart of a method of controlling power supply of the caravan according to one embodiment of the discourse.

As shown in FIG. 2, the disclosure provides a method of controlling power supply of the caravan, and the method is applied to the power control device 10 of the caravan. The method comprises:

S101: receiving a first power parameter of the input interface element;

S102: determining whether there is mains supply to be input into the input interface element according to the first power parameter;

S103: turning on the first switch to make the input interface element be electrically connected to the output interface element if the mains supply is input into the input interface element;

S104: receiving a power parameter of the battery pack if the mains supply is not input into the input interface element;

S105: determining whether a remaining power of the battery pack exceeds a power threshold according to the power parameter of the battery pack;

S106: turning on the second switch to make the battery pack be electrically connected to the AC output interface via the inverter if the remaining power of the battery pack exceeds the power threshold; and S107: turning off the second switch if the remaining power of the battery pack does not exceed the power threshold.

For example, the power control device 10 receives a first power parameter of the input interface element 101, which may be a voltage parameter and/or a current parameter. The first power parameter is used to determine whether the first input interface 1013 is provided with the mains supply. If the first input interface is provided with the mains supply, the mains supply is prior to charge for the electrical equipment of the caravan, and the first switch 102 is controlled to be on, the first input interface 1013 is electrically connected to the AC output interface 1032. Thus the AC electrical equipment can be charged through the AC output interface 1032, saving the power of the battery pack 100.

If the mains supply is not input into the first input interface 1013, the power parameter of the battery pack 100 is received, and it is need to determine whether the remaining power of the battery pack exceeds the preset power threshold. The power threshold can be set as required to ensure that the battery capacity of the battery pack 100 is remained in a relatively sufficient state, so as to ensure the normal operation of the caravan.

If the remaining power of the battery pack 100 exceeds the power threshold, the second switch 110 is controlled to be on to make the battery pack 100 be electrically connected to the AC output interface 1032 via the inverter 109 and the second switch, so as to make full use of the remaining power of the battery pack 100.

If the remaining power of the battery pack 100 does not exceed the preset power threshold, it indicates that the power of the battery pack 100 is insufficient. To ensure that the power of the battery pack 100 is remained in a relatively sufficient state, the second switch 110 is controlled to be off to prevent the battery pack 100 from outputting power through the output interface element 103.

As shown in FIG. 1, in some embodiments, the input interface element also comprises a second input interface, which is electrically connected to the battery pack through a first charger, and the method comprises:

S108: receiving a second power parameter of the input interface element;

S109: determining whether there is a photovoltaic supply to be input into the second input interface according to the second power parameter; and S110: turning on a switch of the first charger to make the battery pack be electrically connected to the photovoltaic plate via the first charger if the photovoltaic supply is input into the second input interface.

For example, receiving the second power parameter of the input interface element 101; determining whether the photovoltaic supply is input into the second input interface 1012 according to the second power parameter; and if the photovoltaic supply is input into the second input interface, the photovoltaic supply is prior to charge for the electrical equipment for full use of photovoltaic energy, and turning on the switch of the first charger 107 to make the battery pack 100 be electrically connected to the photovoltaic plate disposed in the caravan via the first charger 107.

In some embodiments, the power control device further comprises a third switch and a second charger; the first input interface is electrically connected to the battery pack via the third switch and the second charger; and the method comprises:

S111: turning on the third switch to make the first input interface be electrically connected to the battery pack via the second charger if the photovoltaic supply is not input into the second input interface.

For example, if the photovoltaic supply is not input into the second input interface, the mains supply is prior to charge for the electrical equipment of the caravan, and the third switch 104 is controlled to be on so that the mains supply can charge the battery pack 100 through the first input interface 1013 and the second charger 105.

Figure 3:
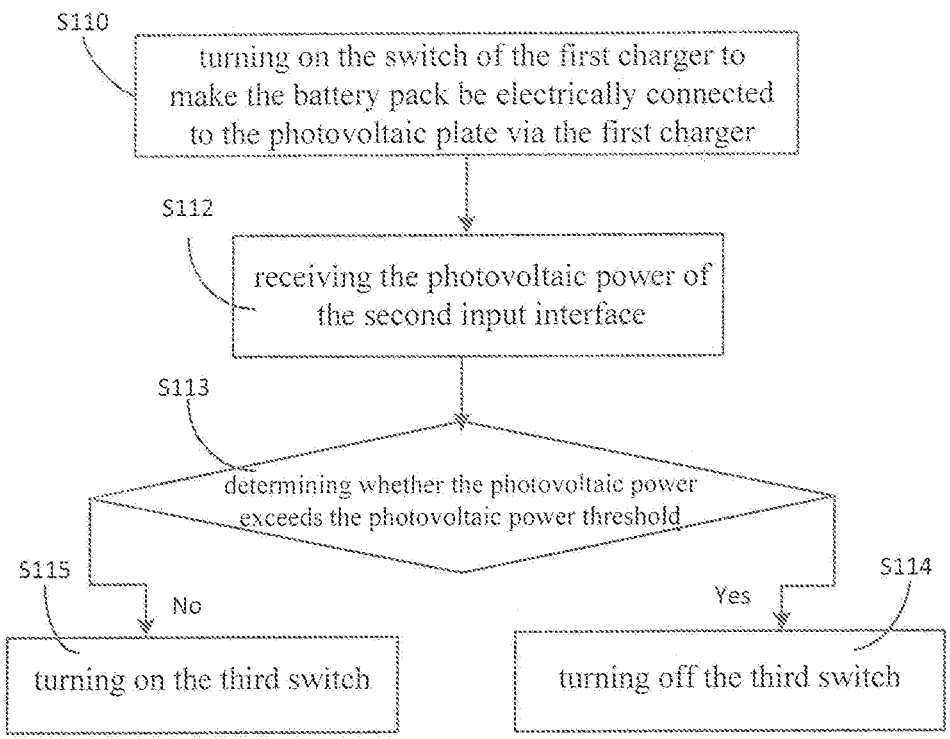
FIG. 3 is another flow chart of a method of controlling power supply of the caravan according to one embodiment of the discourse.

As shown in FIG. 3, in some embodiments, the power control device of the caravan also comprises a third switch and a second charger, the first input interface is electrically connected to the battery pack via the third switch and the second charger. And the method comprises:

S112: receiving a photovoltaic power of the second input interface if the photovoltaic supply is input into the second input interface;

S113: determining whether the photovoltaic power exceeds a photovoltaic power threshold;

S114: turning off the third switch if the photovoltaic power exceeds the photovoltaic power threshold; and S115: turning on the third switch if the photovoltaic power does not exceed the photovoltaic power threshold.

For example, if the photovoltaic supply is input into the second input interface 1012, the photovoltaic power of the second input interface 1012 is received. It is need to determine whether the photovoltaic power exceeds the preset photovoltaic power threshold. If the photovoltaic power exceeds the photovoltaic power threshold, it indicates that the electric energy generated by photovoltaic plate is sufficient to meet the charging demand of the battery pack 100, and the third switch is controlled to be off, so as to charge the battery pack 100 through the photovoltaic plate.

If the photovoltaic power does not exceed the photovoltaic power threshold, it indicates that the electric energy generated by the photovoltaic plate is insufficient, and the third switch is controlled to be on, so that the battery pack 100 can be charged by the photovoltaic plate and the mains supply together.

In some embodiments, the input interface element comprises a third input interface electrically connected to a power generator of the caravan, and the third input interface is electrically connected to the battery pack via a third charger. The method comprises:

determining whether the caravan starts if the mains supply is not input into the first input interface and the photovoltaic supply is not input into the second input interface; and turning on the third charger to make the third input interface be electrically connected to the battery pack via the third charger if the caravan starts.

For example, if the mains supply is not input into the first input interface 1013, it is need to determine whether the photovoltaic power is input into the second input interface 1012. If the photovoltaic power is not input into the second input interface 1012, it is need to check whether the caravan is started. If the caravan is started, the third charger 106 is controlled to be turned on, and the third input interface 1011 can be electrically connected to the battery pack 100 through the third charger 106, so that the generator can be used to charge the battery pack 100.

Figure 4:
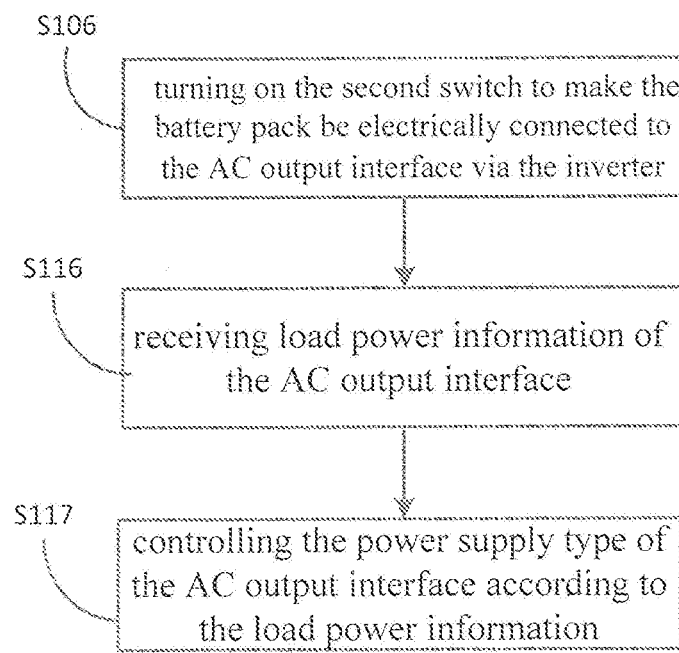
FIG. 4 is still another flow chart of a method of controlling power supply of the caravan according to one embodiment of the discourse.

As shown in FIG. 4, in some embodiments, the method further comprises: S116: receiving load power information of the AC output interface; and S117: controlling a power supply type of the AC output interface according to the load power information.

In some embodiments, the power supply type comprises a first power supply type and a second power supply type; controlling the power supply type of the AC output interface according to the load power information comprises:

determining whether the load power information exceeds a load power threshold; and selecting the second power supply type if the load power information exceeds the load power threshold, and the second power supply type supplies power to preset electrical equipment.

For example, receiving the load power information of the AC output interface, and determine whether the load power of the AC output interface exceeds the preset value according to the load power information. If the load power exceeds the preset value, which means the load power is too large, and the power supply type of the AC output interface is controlled to be the second power supply type, so as to supply power to the preset electrical equipment and avoid the excessive loss of the power of the battery pack 100.

In some embodiments, the power control device further comprises a converter and a DC output interface, and the converter is electrically connected to the battery pack and the DC output interface. The method comprises:

turning on the converter to make the battery pack be electrically connected to the DC output interface if the remaining power of the battery pack exceeds the power threshold.

For example, if the remaining power of the battery pack 100 is sufficient, the converter 108 is turned on so that the electric energy of the battery pack 100 can be converted into the output voltages with different levels, so as to supply voltages for different levels of DC power supply equipment.

In some embodiments, the power control device further comprises a display screen, and the method further comprises displaying the power parameter of the battery pack on the display screen.

The power parameter of the battery pack can be displayed in real time through the display screen, so that the user can know the status of the battery pack 100 in time according to the display screen.

Figure 5:
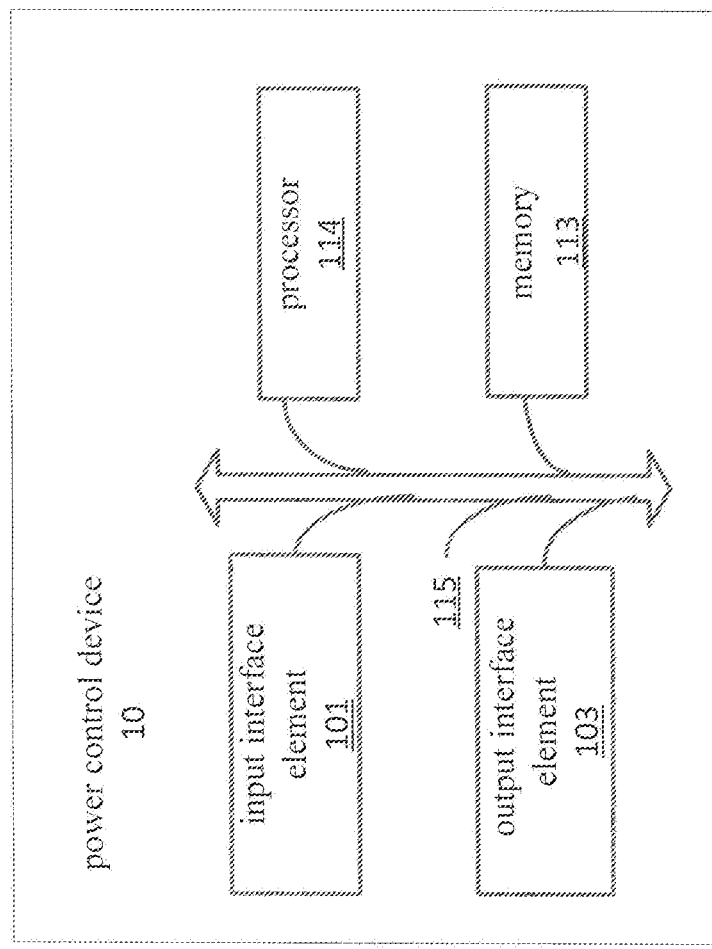
FIG. 5 is another block diagram of the power control device of the caravan according to one embodiment of the discourse.

Referring to FIG. 1 and FIG. 5, in some embodiments, the power control device 10 also comprises a memory 113, a processor 114 and a bus 115. The first switch 102 and the memory 113 are electrically connected to the processor 114 through the bus 115. The battery pack 100, the input interface element 101, the output interface element 103, and the memory 113 are all electrically connected to the processor 114 through the bus 115.

The memory 113 comprises at least one type of readable storage medium, which comprises flash memory, hard disk, multimedia card, card type memory (for example, SD or DX memory, etc.), magnetic memory, disk, optical disk, etc. In some embodiments, the memory 113 may be an internal storage unit of the power control device 10, for example, a hard disk of the power control device 10. In other embodiments, the memory 113 may also be an external storage device of the power control device 10, for example, a plug-in hard disk, a smart media card (SMC), a secure digital (SD) card, a flash card, etc. The memory 113 can be used to store the application software and all kinds of data installed in the power control device 10, for example, codes of computer readable program such as battery management program, and can be used as a storage medium.

In some embodiments, the processor 114 may be a central processing unit (CPU), controller, microcontroller, microprocessor or other data processing chip. The processor 114 may call the program code or processing data stored in the memory 113 to implement the aforementioned power control method of the caravan.

The above description is only preferred embodiments of the disclosure, and does not limit the scope of protection of the disclosure. Any equivalent structure or equivalent process transformation made by using the content of the description and drawings of the disclosure, or directly or indirectly used in other related technical fields, are included in the scope of protection of the disclosure.

What is claimed is:

1. A method of controlling power supply of a caravan, the method being applied to a power control device of a caravan, wherein the caravan comprises a photovoltaic plate; the power control device comprises a battery pack, an input interface element, an output interface element, and a first switch; the photovoltaic plate is electrically connected to the battery pack via the input interface element, and the battery pack is electrically connected to an external electrical equipment via the output interface element; the first switch is electrically connected to the input interface element and the output interface element; and the method comprises:
   receiving a first power parameter of the input interface element;
   determining whether there is mains supply to be input into the input interface element according to the first power parameter;
   turning on the first switch to make the input interface element be electrically connected to the output interface element if the mains supply is input into the input interface element;
   receiving a power parameter of the battery pack if the mains supply is not input into the input interface element;
   determining whether a remaining power of the battery pack exceeds a power threshold according to the power parameter of the battery pack; and
   making the battery pack be electrically connected to the output interface element if the remaining power of the battery pack exceeds the power threshold.

2. The method of claim 1, wherein the input interface element comprises a first input interface, and the output interface element comprises an AC output interface; the first input interface is electrically connected to the AC output interface via the first switch; the method further comprises:
   after receiving the first power parameter of the input interface element, determining whether there is the mains supply to be input into the first input interface according to the first power parameter;
   turning on the first switch to make the first input interface be electrically connected to the AC output interface if the mains supply is input into the first input interface; and
   receiving the power parameter of the battery pack if the mains supply is not input into the first input interface.

3. The method of claim 2, wherein the battery pack is electrically connected to the AC output interface via an inverter and a second switch; the method further comprises:
   after determining whether the remaining power of the battery pack exceeds the power threshold according to the power parameter of the battery pack, turning on the second switch to make the battery pack be electrically connected to the AC output interface via the inverter if the remaining power of the battery pack exceeds the power threshold.

4. The method of claim 3, wherein the input interface element further comprises a second input interface electrically connected to the battery pack via a first charger; and the method further comprises:
   receiving a second power parameter of the input interface element;
   determining whether there is a photovoltaic supply to be input into the second input interface according to the second power parameter; and
   turning on a switch of the first charger to make the battery pack be electrically connected to the photovoltaic plate via the first charger if the photovoltaic supply is input into the second input interface.

5. The method of claim 4, wherein the power control device further comprises a third switch and a second charger, the first input interface is electrically connected to the battery pack via the third switch and the second charger; and the method further comprises:
   turning on the third switch to make the first input interface be electrically connected to the battery pack via the second charger if the photovoltaic supply is not input into the second input interface.

6. The method of claim 4, wherein the power control device further comprises a third switch and a second charger, the first input interface is electrically connected to the battery pack via the third switch and the second charger; and the method further comprises:
   receiving a photovoltaic power of the second input interface if the photovoltaic supply is input into the second input interface;
   determining whether the photovoltaic power exceeds a photovoltaic power threshold;
   turning off the third switch if the photovoltaic power exceeds the photovoltaic power threshold; and
   turning on the third switch if the photovoltaic power does not exceed the photovoltaic power threshold.

7. The method of claim 4, wherein the input interface element further comprises a third input interface electrically connected to a power generator of the caravan, and the third input interface is electrically connected to the battery pack via a third charger; and the method further comprises:
- determining whether the caravan starts if the mains supply is not input into the first input interface and the photovoltaic supply is not input into the second input interface; and
- turning on the third charger to make the third input interface be electrically connected to the battery pack via the third charger if the caravan starts.

8. The method of claim 3, wherein the method further comprises:
- receiving load power information of the AC output interface; and
- controlling a power supply type of the AC output interface according to the load power information.

9. The method of claim 8, wherein the power supply type comprises a first power supply type and a second power supply type; controlling the power supply type of the AC output interface according to the load power information comprises:
- determining whether the load power information exceeds a load power threshold; and
- selecting the second power supply type if the load power information exceeds the load power threshold, and the second power supply type supplies power to a preset electrical equipment.

10. The method of claim 3, wherein the power control device further comprises a converter and a DC output interface; the converter is electrically connected to the battery pack and the DC output interface; and the method further comprises:
- turning on the converter to make the battery pack be electrically connected to the DC output interface if the remaining power of the battery pack exceeds the power threshold.

11. The method of claim 1, wherein the power control device further comprises a display screen, and the method further comprises displaying the power parameter of the battery pack on the display screen.

12. A power control device of a caravan, the caravan comprising a photovoltaic plate, and the power control device comprising:
- an input interface element configured to receive an external current;
- an output interface element configured to transmit a current to an external electrical equipment;
- a battery pack being electrically connected to the input interface element and the output interface element; and
- a first switch;
- wherein the photovoltaic plate is electrically connected to the battery pack via the input interface element, and the battery pack is electrically connected to the external electrical equipment via the output interface element; the first switch is electrically connected to the input interface element and the output interface element; and an external mains supply is transmitted to the external electrical equipment via the input interface element, the first switch, and the output interface element; the power control device further comprises an inverter and a second switch; and the battery pack is electrically connected to the AC output interface via the inverter and the second switch.

13. The power control device of claim 12, wherein the power control device further comprises a first charger, and the input interface element comprises a first input interface and a second input interface; the first input interface is connected to the external mains supply and is electrically connected to the output interface element via the first switch; the second input interface is electrically connected to the photovoltaic plate, and is electrically connected to the battery pack via the first charger.

14. The power control device of claim 13, wherein the power control device further comprises a third switch and a second charger, and the first input interface is connected to the battery pack via the third switch and the second charger.

15. The power control device of claim 14, wherein the power control device further comprises a third charger, and the input interface element further comprises a third input interface electrically connected to a power generator; the third input interface is electrically connected to the battery pack via the third charger.

16. The power control device of claim 12, wherein the output interface element comprises an AC output interface electrically connected to the first switch.

17. The power control device of claim 12, wherein the power control device further comprises a converter; the output interface element further comprises a DC output interface; the battery pack is electrically connected to the DC output interface via the converter.

18. The power control device of claim 12, wherein the power control device further comprises a display screen electrically connected to the battery pack to display a power parameter of the battery pack.

19. The power control device of claim 12, wherein the power control device further comprises a memory and a processor; the battery pack, the input interface element, the output interface element, and the memory are electrically connected to the processor; the memory is configured to store a computer executable power control program of the caravan; and the processor is configured to call the computer executable power control program stored in the memory to execute a method of controlling power supply of the caravan.

* * * * *